UNITED STATES PATENT OFFICE.

ROBERT REIMAN, OF EGG HARBOR CITY, NEW JERSEY.

PROCESS OF MANUFACTURING ARTIFICIAL BONE.

SPECIFICATION forming part of Letters Patent No. 494,891, dated April 4, 1893.

Application filed August 11, 1892. Serial No. 442,798. (No specimens.)

*To all whom it may concern:*

Be it known that I, ROBERT REIMAN, of Egg Harbor City, in the county of Atlantic and State of New Jersey, have invented a new and useful Improvement in the Process of Manufacturing Artificial Bone, of which the following is a full, clear, and exact description.

The invention relates to the production of artificial bone for manufacturing and other purposes, that is, to the composition of a bone-like plastic mass in which the waste portions of natural bone, employed in the arts for instance, may be utilized, and in which the constituent materials of the natural bone are principally contained and in the same proportions, and which consequently possesses the same properties as the natural bone. Numerous attempts have been made to produce the same result, most of which were based either on the principle to cement bonemeal together by a suitable agglutinant, or else using glue in its finished condition and combining it with some white mineral substance, as for instance, phosphate of lime, zinc oxide, heavy spar, or the like, and bringing the mass to the consistency of stiff dough.

My improvement is based, first, upon using natural bone as the starting point or element; secondly, the separation by chemical process of the component parts of natural bone by dissolution; thirdly, the re-combination of these elements, by heat and powerful pressure into a solid mass; and, fourthly, the application of the most direct, uninterrupted method for this purpose and which consequently is the most inexpensive. For the attainment of this result or these ends, natural bone or good or best refuse of bone used in the manufacture of buttons, is ground to the fineness of flour, which then is macerated in hydrochloric acid for, say, one to two days, care being taken to frequently or constantly stir it. After the inorganic matter, principally phosphate of lime, has been dissolved, the latter is precipitated with sodium carbonate, either directly, which is the most expeditious way, or after the liquid part has been separated from the organic solids. Either gives the same results and do not differ in principle. This having been done, that is, the precipitation effected, the combined parts are thoroughly washed and freed from the solution of salts. The normal components of the natural bone are now found again in the substance thus produced, which is of a dough-like consistency and which by the treatment as hereinafter described, forms or furnishes the new or artificial bone. Said product or new raw material is then slightly pressed and dried and well mixed with suitable proportions of alumina sulphate, albumen, and cellulose, the latter being preferably dissolved in zinco or cupro-ammonium oxide-hydrate. When this intimately mixed product or substance is dried to contain about forty per cent. of moisture, it is put into strong press molds and in the first instance only light pressure applied to it. I use for this purpose a steam power press, and after the molds are placed in it, the steam or heating chamber of the press is tightly closed and heat is commenced to be applied and gradual pressure used for several hours and until a temperature of from 250° to 270° Fahrenheit is reached. The object of this is, first, to transform the organic or tissue part of the bone into glue or gelatine; secondly, to combine this by a kind of fusion with the mineral ingredients as in natural bone; and, thirdly, to coagulate the albumen and combine it with all the other constituents or ingredients. After a sufficient action of the heat and pressure, the molds are allowed to remain in the press to cool off, and the pieces of material then taken from the molds and gradually dried in properly constructed receptacles or places which should be well ventilated and warmed. Usually it will take from three to four weeks to dry the material and three or four months for it to mature.

To die the material or otherwise subordinately treat it, dyeing stuffs, either tannic or chromic acid or other agents, may be introduced into the material in the course of its preparation.

The composition, when properly manufactured, is very durable, its appearance as to fineness of grain and color is faultless, and it may be so cheaply made as to give it a readily salable position on its merits. It is also uninflammable and will not shrink after it is in a mature state.

To epitomize, the invention is mainly based, first, upon the dissolving of the bone or bone-meal; secondly, on the precipitation of the dissolved minerals; thirdly, on their recombination with the bone fiber; and fourthly, on the development of the gelatine.

Having thus fully described my invention, I claim as new and desire to secure by Letters Patent—

1. In the manufacture of artificial bone, the process herein described of producing a bone-like composition, which consists in first chemically dissolving natural bone or bone-meal into its main constituents, then neutralizing these elements by precipitation, filtering and washing them and afterward mixing them with albumen, alumina sulphate and cellulose in solution, and subsequently, when partly dried, subjecting the material to a high temperature and simultaneously applied powerful pressure.

2. The process of manufacturing artificial bone, which consists in separating or dividing by chemical action, the constituent parts of raw or natural bone in a finely comminuted state, and after preparation by precipitation and washing, mixing them together with substances operating to produce a hardening effect and to develop the original bone substance into gelatine by a high heat, at the same time keeping the mass under strong pressure in suitable molds or receptacles as described.

ROBERT REIMAN.

Witnesses:
HERMAN DIETZ,
LOUIS LURCH.